(12) United States Patent
Iulianello et al.

(10) Patent No.: US 6,938,007 B1
(45) Date of Patent: *Aug. 30, 2005

(54) METHOD OF PRICING APPLICATION SOFTWARE

(75) Inventors: Carol M. Iulianello, Webster, NY (US); Paula J. Jamieson, Durango, CO (US); Katherine H. DiPietro, Rochester, NY (US); Kriste M. Vincent Lawrence, Rochester, NY (US); James C. Erbelding, Webster, NY (US); Mira M. Thompson, High Wycombe (GB); Graham R. Anderson, Leigh-on-Sea (GB); Hassan T. Rashid, Maple (CA)

(73) Assignee: Electronics Data Systems Corporation, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/660,616

(22) Filed: Jun. 6, 1996

(51) Int. Cl.$^7$ .............................................. G06F 17/60
(52) U.S. Cl. ................................. 705/34; 705/1; 705/7; 705/8; 705/9
(58) Field of Search ............................... 705/400, 7, 8, 705/30, 34, 1, 9, 11; 364/468.12, 468.15

(56) References Cited

U.S. PATENT DOCUMENTS

| | | | | |
|---|---|---|---|---|
| 3,702,003 A | * | 10/1972 | Ramirez, Jr. et al. ............ 705/7 |
| 3,710,568 A | * | 1/1973 | Rice ............................ 60/39.31 |
| 5,189,606 A | * | 2/1993 | Burns et al. .................... 705/10 |
| 5,208,765 A | * | 5/1993 | Turnbull .................... 705/10 X |
| 5,237,498 A | * | 8/1993 | Tenma et al. ................. 705/30 |
| 5,249,120 A | * | 9/1993 | Foley ............................. 705/1 |
| 5,367,450 A | * | 11/1994 | Pintsov .......................... 705/8 |
| 5,446,895 A | * | 8/1995 | White et al. ................. 395/650 |
| 5,546,564 A | * | 8/1996 | Horie ...................... 705/400 X |
| 5,570,291 A | * | 10/1996 | Dudle et al. .............. 705/10 X |
| 5,771,179 A | * | 6/1998 | White et al. ........... 354/551.01 |

OTHER PUBLICATIONS

Sanders D. H., Computers in Business, McGraw–Hill Book Co., pp. 373 and 378, 1968.*

Friedman A. L., Computer Systems Development: Hystory, Organization and Implementation, John Willey & Sons, pp. 173–183, 1993.*

Strategic and Operational Planning for Information SErvices, QED Information Sciences, Inc., Mass., 225–235, 1989.*

(Continued)

Primary Examiner—Hyung Sough
Assistant Examiner—Pedro R. Kanof
(74) Attorney, Agent, or Firm—Baker Botts L.L.P.

(57) ABSTRACT

In one aspect, an automated method is provided for updating cost data for a software application in a maintenance environment. The method includes collecting functional metrics data and determining a composite index. A maintainability index is calculated, and an average cost per full-time equivalent is recorded. A maintenance unit cost is then calculated from the composite index, the maintainability index, and the average cost per full-time equivalent.

In another aspect, an automated method is provided for computing cost of a software application in an enhancement environment. The method includes collecting functional metrics data, determining a composite, and calculating a maintainability index. An average cost per full-time equivalent is recorded, and a size of the application in function points is estimated. An enhancement unit cost is then calculated from the composite index, the maintainability index, the average cost per full-time equivalent, and the estimated function point size.

15 Claims, 4 Drawing Sheets

OTHER PUBLICATIONS

Hogbin G. and Thomas D. V., Investing in Information Technology, McGraw–Hill Book Co., . pp. 130–141, 216–239, 1994.*

Peters, J.F., III and S. Ramanna, "Application of the Choquet Integral in Software Cost Estimation", IEEE Int'l Conf. on Fuzzy Systems, vol. 2, (Sep. 8–11, 1996), pp. 862–866.*

Anger, Frank D. and John C. Munson and Rita V. Rodriguez, "Temporal Complexity and Software Faults", IEEE, (Nov. 6–9, 1994), pp. 115–125.*

Ghorpade, Rashmi A., "Expert System for Estimation of Software Cost", University of Louisville, Masters Abstracts, vol. 28/01, (1989), pp. 133–225.*

Subramanian, G. and S. Breslawski, "The Importance of Cost Drivers Used in Cost Estimation Models: Perceptions of Project Managers", Proceedings of 1994 Information Resources Mgmt Assoc. Int'l Conf., (May 22–25, 1994).*

"Software Productivity Research, Inc. Touts New Case Tool For Function Point Analysis", Dateline Newswire, Apr. 15, 1987.*

Abdel–Hamid, Tarek K., "Adapting, Correcting, and Perfecting Software Estimates: A Maintenance Metaphor", COMPUTER, (Mar. 1993), pp. 20–29.*

Clark, Bradford K., "Cost Modeling Process Maturity—COCOMO 2.0", IEEE, (Jun. 1996), pp. 347–360.*

Eliot, Lance B., "Case–based Reasoning In Estimation", AI Expert, vol. 8, No. 5 (May 1993), pp. 3–11.*

Weinberg G. M., Quality Software Management, V4, Dorset Hpuse Publishing, pp. 75–79, 255–257, 380–384. 390–397, 1997.*

Vessey I. and Weber R., Some Factors Affecting Program Repair Maintenance: An Empirical Study, Communications of the ACM. V2, N2, pp. 128–134, 1983.*

Kafura D. and Reddy G. R., The Use of Software Complexity Metrics in Software Maintenance, Software Engineering, IEEE Transactions, V. SE–13, N3,. pp. 335–343, 1987.*

Grady R. B., Practical Software Metrics For Project Management and Process Improvement, Prentice Hall, N.J., pp. 17–18, 1992.*

* cited by examiner

METHOD OF PRICING APPLICATION SOFTWARE

TECHNICAL FIELD OF THE INVENTION

This application is related in general to the field of software development and production, and more particularly, to a method of estimating the cost and price of application software.

BACKGROUND OF THE INVENTION

In the software development field, an "application" generally is a portfolio of software routines which is designed to meet a customer's specific requirements or perform a collection of related business functions. The word "application" can be used interchangeably with the phrase "application software." Also, in the software development field, a "project" generally is a collection of work tasks, with each task having a specific start and end date and a specific software product to be delivered.

All work performed on an application by systems engineers, programmers, managers and support staff may be classified into three categories: development, enhancement and maintenance services. Development services can include the creation of new solutions to problems solved by an existing application, or the replacement of an existing application. Essentially, a new application can be developed as one project, or it can be developed in phases, with a deliverable for each phase. Enhancement services can include the creation, installation and integration of new system functions, typically in response to a customer's or user's changes in requirements. These services can include any new functions that are needed to improve efficiency or enhance the level of service that the application provides. Maintenance services can include the correction of errors caused by any of a variety of different items or tasks, including, but not limited to, software programs, hardware, networks, scheduling, job control language, and software upgrades or changes. Maintenance can also include the correction of an application that fails to perform to the original functional specifications.

In pricing conventional application development, enhancement and maintenance contracts, the contractors (those who develop, produce and market application software) estimate the cost and price of new developments, enhancements or the maintenance of applications, by estimating the time and staff that will be needed to perform the development, enhancement or maintenance tasks. One frequently used costing technique is to estimate the number of staff full-time equivalents (FTEs) needed to perform the tasks. One FTE is equal to one month of effort (e.g., 12 FTEs equal one staff year). However, these FTE-based estimates are highly subjective and typically inaccurate. The primary problem with effort-based or FTE-based estimates is that they are unique to specific projects. Such an estimate does not constitute a normalized or standardized method which can be used by customers and vendors for enterprise-wide planning and forecasting. It does not provide any notion of the output relative to the effort incurred or the enterprise-wide value delivered to the customer. In a customer-vendor relationship, effort-based costing is not conducive to savings based on improved productivity and decreases in effort. Moreover, numerous external factors (e.g., project schedule, required reusability, reliability, work environment, user communication, project risk) can contribute to the ultimate cost of an application development, enhancement or maintenance project, which are not controllable during the project, and therefore, cannot be accounted for adequately with an FTE-based estimate.

Conventional application development, enhancement and maintenance projects are typically bid as either "fixed price" or "time and materials" contracts. Since the price is "capped" in a fixed priced contract, the contract "risk" is borne by the contractor who has bid with an FTE-based estimate. The primary problem with a fixed price contract is that it does not provide any flexibility with respect to requirements changes. Conversely, the "risk" in an FTE-based "time and materials" contract is borne by the customer. Consequently, because of the difficulties inherent in FTE-based estimating, the "risk" found in inaccurate pricing of application development, enhancement and maintenance projects has long been seen as a significant problem to be corrected, from both the contractors' and customers' points of view.

SUMMARY OF THE INVENTION

Accordingly, there is a need for a method of relating the cost and price of an application to the amount of output of the software development process.

In accordance with an embodiment of the present invention, an automated method is provided for updating cost data for a software application in a maintenance environment. The method includes collecting functional metrics data. A composite index is determined. A maintainability index is calculated. An average cost per full-time equivalent is recorded. A maintenance unit cost is then calculated from the composite index, the maintainability index, and the average cost per full-time equivalent.

In accordance with another embodiment of the present invention, an automated method is provided for computing cost of a software application in an enhancement environment. The method includes collecting functional metrics data. A composite index is determined. A maintainability index is calculated. An average cost per. full-time equivalent is recorded. A size of the application in function points is estimated. An enhancement unit cost is then calculated from the composite index, the maintainability index, the average cost per full-time equivalent, and the estimated function point size.

An important technical advantage of the present invention is that a relatively simple and consistent method of estimating the cost of developing, enhancing or maintaining application software is provided by two inputs to a cost model: (1) an estimate of the size of the software product in function points; and (2) a profile of those characteristics that describe the physical complexity of the work environment and the physical requirements of the software product.

Another important technical advantage of the present invention is that the use of indexing of multiple profile characteristics and statistical modeling results in the formation of a set of "bands" or price ranges for which a marginal unit cost for an application can be derived. The software application can then be assigned to a band based on the application's unique profile. Thus, the number of different cost structures may be finite but fair in terms of representing the level of effort required to build or maintain a given application.

BRIEF DESCRIPTION OF THE DRAWINGS

For a better understanding of the present invention, reference may be made to the accompanying drawings, in which.

DETAILED DESCRIPTION OF THE INVENTION

Figure 1A:
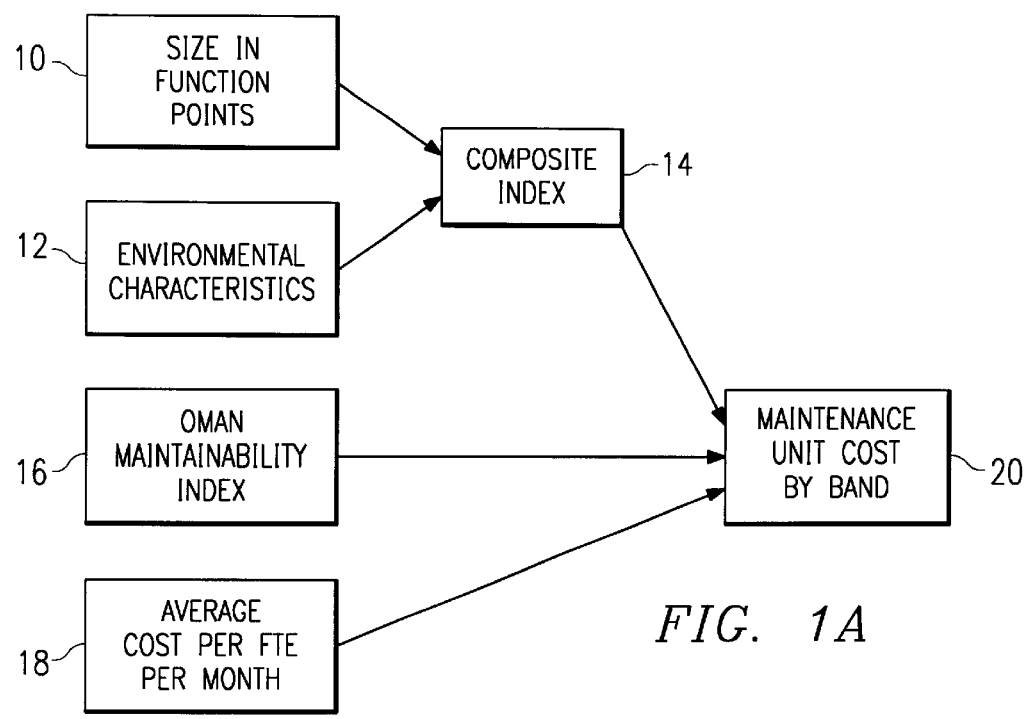
FIG. 1A is a high level block diagram that generally illustrates a method of determining the cost of maintaining an application, in accordance with a preferred embodiment of the present invention.

FIG. 1A is a high level block diagram that generally illustrates a method of determining the cost of maintaining an application, in accordance with a preferred embodiment of the present invention. Maintenance services can include the correction of errors caused by software programs, hardware, networks, scheduling, job control language, and software upgrades or changes. Maintenance can also include the correction of an application that fails to perform to the original functional specifications.

Referring to FIG. 1A, at block 10, the size (in function points) of an application is received for the maintenance to be performed. At block 12, the environmental characteristics of the application are gathered. The environmental characteristics may include information specifying the number of users and user sites involved in the application. Weights can be assigned to each of the size of the application, the number of users, and the number of sites. At block 14, the application's size and environmental characteristics are used to determine a composite index. Preferably, the composite index is derived by summing size, user and site weights for the application together. At block 16, the Oman Maintainability Index (developed by Dr. Paul Oman of the University of Idaho, Moscow) is calculated for the application. At block 18, the average cost per FTE per month is recorded. At block 20, the composite index, the Oman Maintainability Index, and the average cost per FTE per month are used to derive the maintenance unit cost for the application. The maintenance unit cost is then used in the present costing model to determine the application's unit cost. The price to support the application can then be calculated, by adding the calculated total direct cost to the application's fixed overhead cost, and then adding an amount for profit. The details for these blocks 10–20 appear throughout the remainder of this description.

Figure 1B:
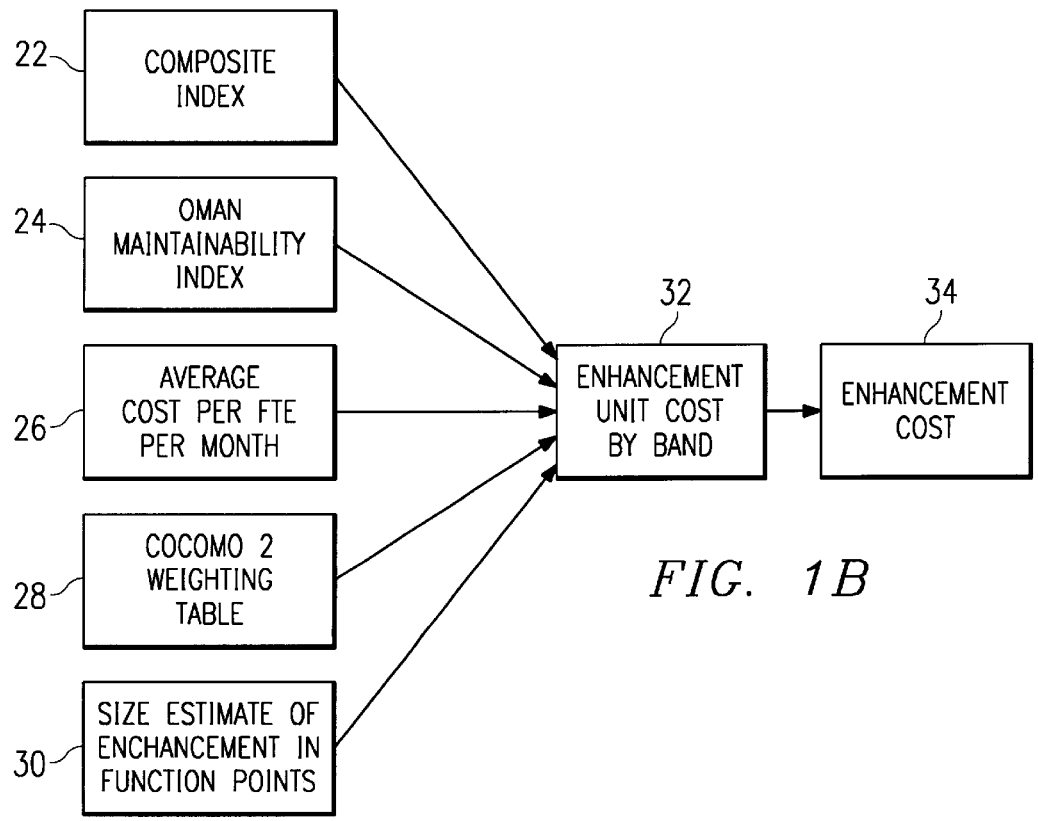
FIG. 1B is a high level block diagram that generally illustrates a method of determining the cost of enhancing an application, in accordance with a preferred embodiment of the present invention.

FIG. 1B is a high level block diagram that generally illustrates a method of determining the cost of enhancing an application, in accordance with a preferred embodiment of the present invention. Enhancement services can include the creation, installation and integration of new system functions, typically in response to a customer's or user's changes in requirements. These services can include any new functions that are needed to improve efficiency or enhance the level of service that the application provides.

Referring to FIG. 1B, at block 22, the composite index for the application affected most by the enhancement is gathered. At block 24, the Oman Maintainability Index is calculated for that application. At block 26, the average cost per FTE per month is recorded for the application. At block 28, a weighted table (e.g., "COCOMO.2" weighting table described below) of questions is used to develop certain information (described below) to be used in determining the unit cost of the enhancement to the application. At block 30, the size (in function points) of the application is estimated for the enhancement to be performed. At block 32, the composite index, the Oman Maintainability Index, the average cost per FTE per-month, and the information derived from the COCOMO.2 weighting table are used to derive the estimated enhancement unit cost. The size estimate in function points (block 30) for the enhancement is multiplied by the enhancement unit cost to derive the total estimated cost for the enhancement. The estimated price of the enhancement can then be calculated, at block 34, by adding a profit amount to the estimated enhancement cost. The details for blocks 22–34 appear throughout the remainder of this description.

With reference to both FIGS. 1A and 1B, while the magnitude of the application's functional output can be measured by counting the output (function points), this value represents volume of function points delivered. Other measures may be used to compute the indices from the environmental characteristic and maintainability metric which form the basis for the marginal cost structure, because they describe inputs to the application development or maintenance process. The total cost, therefore, can be represented by the marginal cost to produce a function point, times the volume of function points delivered.

An important feature of the present cost model is that marginal unit cost "bands" are derived based on simultaneous analyses of multiple indices. These "bands" allow the use of an ordinal approach in which an application can be assigned to a cost category that accurately reflects the level of effort needed to develop, maintain or enhance the application.

Figure 2:
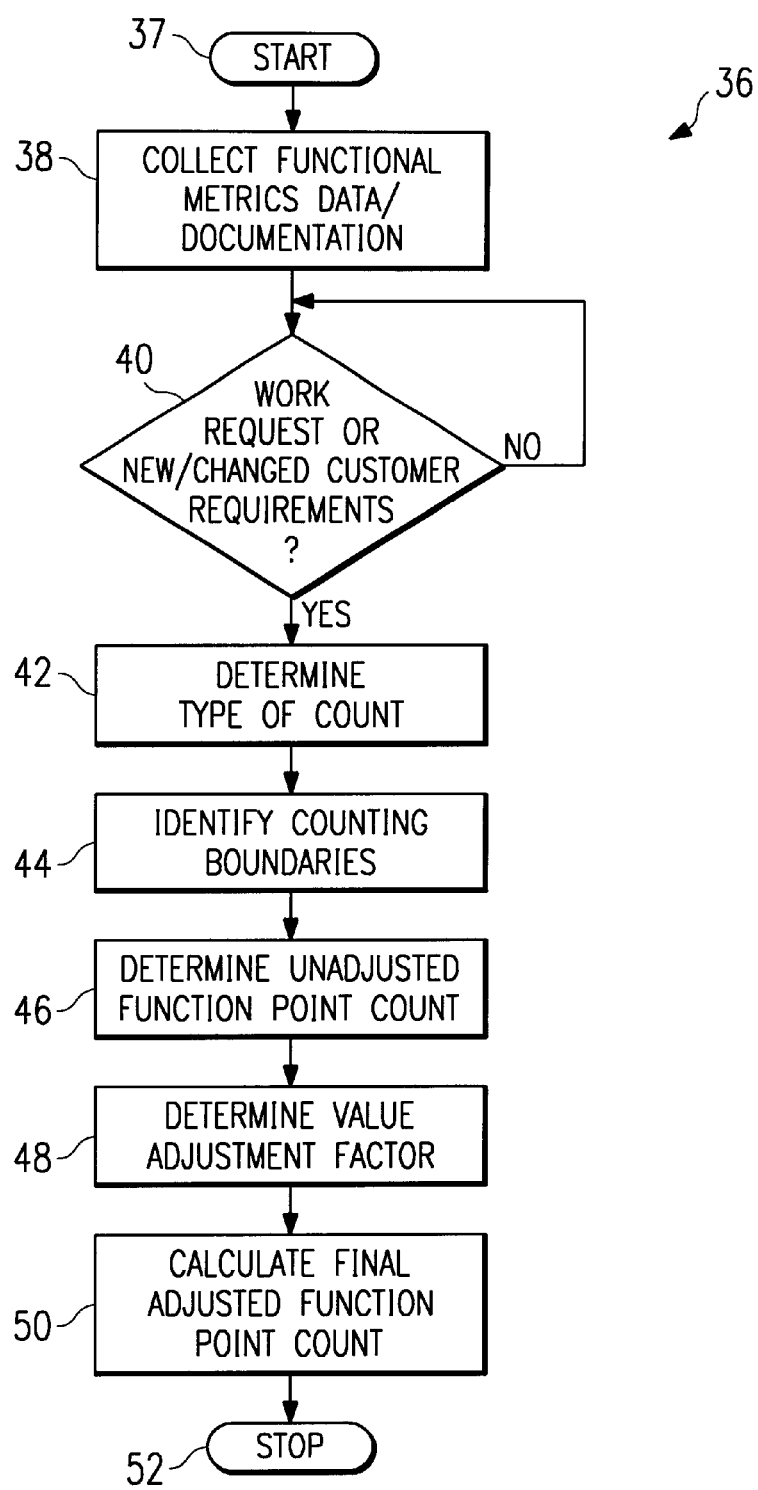
FIG. 2 is a block diagram of an exemplary method that may be used to measure the functional size of an application.

FIG. 2 is a block diagram of an exemplary method 36 that may be used to measure the functional size of an application. The size estimate or measurement (e.g., block 10 in FIG. 1A) is preferably expressed in "function points," which define the work-product or output of the application. A "function point" is a unit of measure of the work-product of software development.

This work-product is expressed in terms of functionality (e.g., functional components and functional complexity) from the customer's or user's viewpoint. Method 36 is initiated at block 37.

At block 38, functional metrics data is collected. There are two basic types of metrics: computed metrics and primitive metrics. A computed metric is a mathematical combination of two or more primitive metrics. A primitive metric is the lowest level of systems engineering measurement data element that can be counted. Primitive metrics can include, for example, and not by way of limitation, effort, size, defects, duration, change, staff and computer resources.

An "effort" primitive metric is preferably defined as the number of net labor hours expended to complete a task related to a project or ongoing maintenance. As mentioned above, a "project" is defined as a collection of work tasks having specific start and end dates, and a specific product to be delivered. All enhancement work is preferably considered project work. The unit of measurement for the "effort" metric is preferably one hour.

A "size" primitive metric is preferably defined as how big (functionally) a software product is, or will be. The software "product" can include an existing application or project, regardless of its size or classification (e.g., maintenance, enhancement or new development). "Size" is measured in function points, in accordance with an international standard (described below).

A "defect" primitive metric is preferably defined as a fault, failure or error in the software, which has to be corrected because the application does not conform to design constraints or requirements, or simply does not work. A "defect" metric is used to measure the quality of an application, and can include, for example, errors with respect to the application's design or requirements, production abends caused by failure of the application's software, and performance shortfalls.

A "duration" primitive metric is preferably defined as the elapsed number of calendar days required to complete a project.

A "change" primitive metric is preferably defined as any change to the functional requirements that occurred during the construction phase, system test phase, integration test phase, or user acceptance and production phases. A "change" can include, for example, a modification, enhancement, and refinement of thought initiated by a customer. "Changes" provide a measure of an application's stability.

"Environmental characteristics" are primitive metrics, which preferably are attributes of a project or system that affect its quality, complexity and productivity. Environmental characteristics can include information about the basic characteristics of the project, the type of application, the application's features, the target platform, criticality, customer organizational complexity, application components, enhanced characteristics, interfaces, and degree of innovation. In addition, for a development project, environmental characteristics can include the design complexity of the application, the programming complexity, data complexity, and methodologies and tools used to develop the application. "Environmental characteristic" metrics may be used to estimate future projects' sizes, efforts and other resource requirements.

As stated before, a computed metric is a mathematical combination of two or more primitive metrics. Computed metrics can include, for example, and not by way of limitation, percentage of products delivered on time, costs/function point developed, costs/function point maintained, defects/thousand function points developed, defects/thousand function points maintained, function points delivered/elapsed month, changes/thousand function points, and changes/application. Some productivity computed metrics can include, for example, effort/function point delivered, effort/function point maintained, function point maintained/elapsed month, and percent reusability (preferably for enhancements).

"Percentage of projects delivered on time" is a computed metric that determines whether or not a project's implementation date has met its estimated implementation date.

"Costs/function point delivered" includes two metrics that are computed, with one for development projects and the other for enhancement projects. The "costs" preferably represents the developer's charges to the customer. The "function point delivered" preferably represents the project's function points at completion of the project.

"Costs/function point maintained" includes two metrics. The "costs" here preferably represents the developer's maintenance charges to the customer. The "function point maintained" preferably represents the application's function points, after applying any changes that may have occurred to these function points during a reporting period.

"Defects/thousand function points developed" includes the "defects" and "function points" primitive metrics. The "function points" primitive metric preferably represents project size in function points.

"Defects/thousand function points enhanced" also includes the "defects" and "function points" primitive metrics. The "function points" in this calculation also preferably represent project size in function points, instead of the total function points of the application being enhanced.

The "defects/thousand function points maintained" metric is computed for normal operation of the application. The "function points" in this calculation represent the total function points of the application being maintained.

"Function points delivered/elapsed month" is preferably computed for two types of metrics; one for development projects and the other for enhancement projects. The "function points delivered" in this calculation represents project size in function points.

Functional metrics data is preferably collected for at least five, high-level application metrics: effort; size (in function points) of enhancements delivered; changes in size to application asset counts that result from enhancements, retirements, or correcting errors; number of defects resulting from enhancement projects or in systems in production; and number of changes required on enhancement projects. This metric information is collected preferably in three forms: by type of effort (time allocation); by project (enhancement or development); and by application (maintenance). The high-level application metrics and forms of metric information described above are exemplary only. It should be understood that in other embodiments, the functional metrics data that is collected may comprise only a portion of these high-level application metrics and/or forms of metric information and any other suitable high level application metrics or forms of metric information. All of this information is preferably stored in the metrics database (described below) for analysis and used to determine the costs and pricing of applications.

The effort metrics information is preferably collected monthly, and can include maintenance, enhancement and development effort information. In collecting effort metrics data, all hours worked are recorded. For example, for all enhancement or development activities, the hours worked are recorded by project. For all maintenance activities, the hours worked are recorded by application. For work on all other activities (e.g., non-application or non-project work), the hours involved can be recorded as miscellaneous effort information.

Generally, project enhancement or development metrics information is preferably collected at the beginning and end of each project, and can include, for example, size (function points), defects (occurring within 30 days after implementation), start and end dates (estimated and actual), and effort (estimated and actual) information. Project metrics information can be collected when a project is started, after project estimates have been completed, after the developer and customer have approved the project, after project implementation has been completed, and 30 days after the project has been completed. Typically, when the project is started, the following information is recorded: the project's identification (ID) and name, the ID of any major project this project is related to, an initial estimate of the cost band this project falls into, and the ID and name of each application impacted by this project.

Once the project estimating phase has been completed, the following information is preferably recorded: estimated start and end dates, estimated effort and number of staff, estimated project function points. (by application), updated estimated price band for the project, and an updated list of applications impacted. After the project has been approved, the following information is preferably recorded: revised estimated start and end dates, revised estimated effort and number of staff, and revised estimated project function points (by application). Once project implementation has been completed, the following information is preferably recorded: the actual start and end dates for the project, a count of all requirements changes that occurred after the project was approved, the number of function points delivered (by application, if possible), how each application's size was affected by the project (net difference between size before and after the project), and the actual effort (derived from the time allocation metrics). Thirty days after the project has been completed, the actual number of defects that occurred during the thirty days is recorded (by application).

The application maintenance metrics information is preferably collected monthly, by application, and can include, for example, defect and size update information. The following information is preferably recorded for each application: a count of all the maintenance and production support defects that have occurred during the month, and a revised function point asset count (i.e., net change) preferably only if any maintenance activity has occurred that resulted in a change to the application's function point asset count.

As mentioned above, function points are basic metric units which are used to measure the size of an application. They provide a measure of the application's functions from the customer's perspective. Notably, they also provide a measure of the developer's output which forms a basis for pricing the application and billing the customer. Function points are preferably counted in accordance with rules promulgated by the International Function Point User Group (IFPUG). A version of these IFPUG rules that has been successfully used to count function points is Release 4.0 (1994).

Function points measure the work-product of software developments. This work-product is expressed in functionality terms (as seen from the customer's or user's viewpoint). This functionality can be further expressed in terms of functional components and functional complexity. The functional components can include certain transactional functions, such as, for example, external inputs (e.g., an input transaction), external outputs (e.g., an output report), or external inquiries (e.g., an on-line inquiry made by a user or analyst). The functional components can include certain data functions, such as, for example, internal logical files (e.g., an application file), or external interface files (e.g., an external database of files).

The functional complexity can include certain record element types, such as, for example, the number of data subgroupings or unique record formats involved. Functional complexity can also include certain data element types, such as, for example, the number of user variables or fields involved. Or, functional complexity can include certain types of files referenced, such as, for example, the number of files referenced, read, created or updated.

Typically, the process of counting function points can be started when a work request or task assignment is received, and the customer's requirements have been determined, or alternatively, when the development of a new system results from new or changed customer requirements. Thus, referring again to FIG. 2, at block 40, it is determined whether a work request has been placed, or, if there are new/changed customer requirements.

A work request can be in the form of a written document from the customer, an oral request from a customer, or an abend call from an Information Processing Center (IPC). All development, enhancement or maintenance work done is preferably done in response to a work request. At this point, the function points counted will likely be estimates, but they still allow initiation of the billing process. The following information can be used as a guideline to determine when function points should be counted.

The development of a new system can include activities that support the development process, from project definition through user training and software installation. For new developments, function points are preferably counted at the end of the requirements, design and implementation phases. Function points may be counted, for example, when a personal computer spreadsheet application is developed that redefines a customer's business process.

Function points are also preferably counted when the enhancement (modification) of an existing system results from new or changed customer requirements that involve functionality changes, process and data structure changes, or process and data structure changes and/or modifications to the hardware platform or system software. For typical enhancements, function points are preferably counted at the end of the requirements, design and implementation phases. For relatively small enhancements (e.g., adding a data field to a file and updating reports to print this field), function points are preferably counted after the end of the implementation phase.

For maintenance of existing software, error corrections typically have little or no impact on the size of the system. Consequently, function points are typically not required to be counted for maintenance activities. However, in some cases, an error correction may require a functionality change which can result in an increase or decrease of the size of the system. Therefore, in these cases, the net change in function points to the application are preferably counted.

Referring again to FIG. 2, in order to count function points, the following procedure is preferably followed. At block 42, the type of count to be made is determined (e.g., development, enhancement and/or application count). Next, at block 44, the counting boundaries are identified. At block 46, the unadjusted function point count is then determined, which includes, for example, a count of the data function types involved (number of internal logic files and external interface files), and a count of the transactional function types involved (number of external inputs, external outputs, and external inquiry connections). Using the methods set forth in the IFPUG "Counting Practices Manual" (Version 4.0), at block 48, a value adjustment factor is then determined, and at block 50, the final adjusted function point count is calculated. Additionally, following the procedures set forth in the IFPUG Counting Practices Manual, a spreadsheet has been developed that may be used to automatically calculate these function points.

A new development function point count is a metric that measures the functions provided to end users by the first installation of software delivered when the project has been completed. Using the spreadsheet and IFPUG counting procedure mentioned above, the application's adjusted function point count can be determined. The same process may be used to complete a function point count for an existing application (e.g., application "base" count). An enhancement function point count is a metric that measures modifications made to an existing application that add, change, or delete user functions delivered when the project was completed. Using the spreadsheet and counting procedure described above, each application that was affected by the enhancement project is determined. For each such application, the spreadsheet may be used to determine the value of the enhancement project count. The total enhancement project count may be obtained by adding the values of the application's enhancement project counts. The application maintenance function point count is the baseline number of function points used. As mentioned above, maintenance activities (e.g., error corrections) do not typically change the baseline number, except for maintenance activities that corrected an application that failed to perform to the original functional specifications. Using the spreadsheet and procedure described earlier, the maintenance project count may be determined. The total enhancement project count may be obtained by adding the values of the application's enhancement project counts.

The following types of function points can be calculated automatically using the spreadsheet described above. However, development function points may be calculated manually (for each new development project) by adding the unadjusted function points to the conversion function points, and multiplying that sum by the value adjustment factor. Enhancement function points may be calculated (for each enhancement project) by adding the total function points (added above) to the total function points changed, and adding that sum to the number of conversion function points. The resulting sum is multiplied to the value adjustment factor (after the change). That result is added to the resultant of the total function points deleted, multiplied by the value adjustment factor (before the change). Since a project enhancement may affect more than one application, an enhancement count for the project is determined along with an application asset count for each application within the project.

Application (e.g., asset) function points may be calculated manually after an enhancement, by adding the unadjusted function points before the change to the sum of the total function points added, and the total function points changed (after the change). The sum of the total function points changed (before the change) and the total function points deleted, is multiplied to the value adjustment factor after the change. That resultant is subtracted from the result of the first addition.

For those applications that were not recounted while the baseline count was being verified, the items to be changed during the project are preferably counted before the changes are made. Then, these items are preferably counted again, after the changes have been made. The unadjusted function points before the change is preferably the baseline count number given to the application (after the baseline verification task is completed), multiplied by the value adjustment factor before the change. These values allow a user to perform a valid calculation of application function points after an enhancement. Finally, new application baseline function point initial counts are preferably calculated for each new application, by summing the total function points (added above) with the value adjustment factor.

Figure 3:
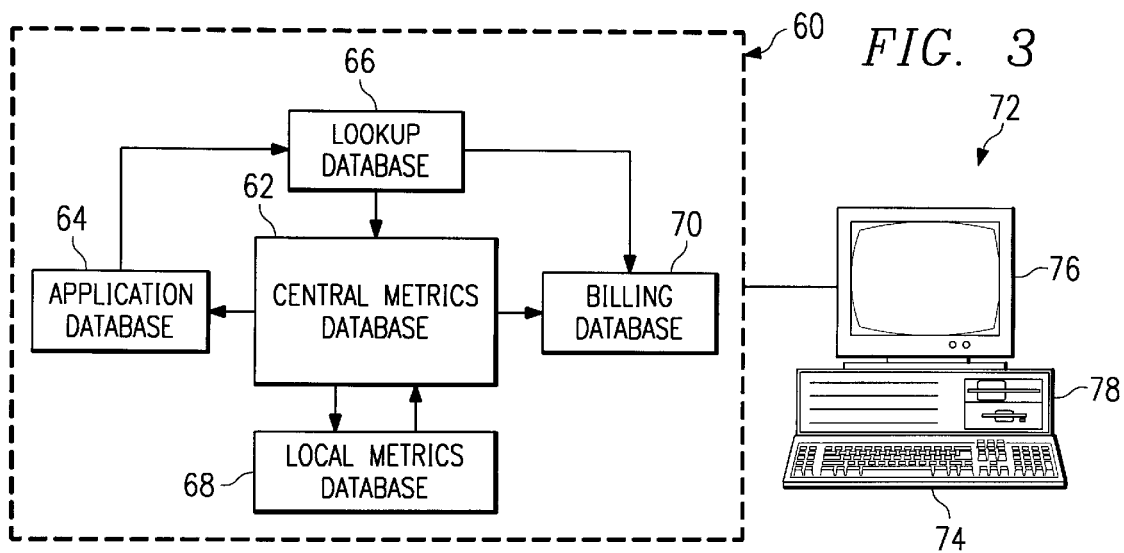
FIG. 3 is a high level block diagram of an exemplary metrics cost estimating system, according to a preferred embodiment of the present invention.

FIG. 3 is a high level block diagram of the metrics system 60, according to a preferred embodiment of the present invention. Referring to FIG. 3, the metrics system 60 is preferably composed of a central metrics database 62, an applications database 64, a lookup database 66, a local metrics database 68, and a billing database 70.

Any or all of these databases can be a relational database that resides in a storage device associated and communicating with a processing device, shown generally as a work station 72. A Desktop 590 with an Intel Pentium processor manufactured by COMPAQ has been successfully utilized as work station 72 for communicating with, and transferring data and files between, the databases shown in FIG. 3. Also, a mid-range or personal computer having a 486 processor may be used.

Work station 72 maintains and executes the instructions to implement the cost estimating and pricing of an application. Work station 72 includes an input device 74, such as a keypad, touch screen, or other device than accept information. An output device 76 conveys information associated with the operation of system 60 including digital data, visual information, or audio information. Both input device 74 and output device 76 may include fixed or removable storage media, such as magnetic computer disk, optical disk, CD/ROM, or other suitable media to both receive output from and provide input to system 60. One or more processors 78 and their associated memories execute instructions and manipulate information in accordance with the operation of system 60 described below.

Metrics collected by function point counting is preferably input and stored for analysis and processing in the central metrics database 62.

Application data is preferably stored and maintained in the application database 64. The data stored in the application database 64 can also include, for example, group information (e.g., marketing, administration information), and entity information (e.g., customer or user information). The following information is preferably stored in the applications database 64: application ID, application name, application description, number of users, number of users' locations, group name, entity ID, entity's organization name, and maintenance chargeband.

The application data is preferably replicated and stored in summarized form in the lookup database 66. The lookup database 66 is updated regularly (under the control of work station 72) to reflect any changes made to the application data stored in the application database 64. Consequently, the data stored in the lookup database 66 can include, for example, application information, entity information and group information.

Budget or cost center information may also be stored in the lookup database.

The billing database 70 stores the pricing information for applications or projects, and forms the basis for the bills to be sent to customers.

Application data can be transferred for processing (under the control of work station 72) from the lookup database 66 to the central metrics database 62 or the billing database 70. Application information stored in the application database 64 are preferably updated by changes made to application data stored in the central metrics database 62.

Each user in the system can communicate with, analyze and change data stored in the central metrics database 62 via a local metrics database 68. The metrics system 60 is preferably a multi-user system. Although a single local metrics database: 68 is shown in FIG. 3, the present invention is not intended to be so limited and can include a plurality of local metrics databases 68. A system user or analyst can communicate with, and analyze and/or change data in, the local metrics database 68 via a Windows-type application running on work station 72. Project information may be input (via the work is station and local metrics database 68) to the central metrics database 62, such as, for example, the project's name, project description, project category (e.g., enhancement, new development), estimated function point count, estimated start and end dates, estimated effort (work hours), project staff, applications that will be affected by project (e.g., for enhancement), entities that will be affected by the project (e.g., for new development), and actual start date of the project. Systems programming may be performed by a software artisan using C++.

Project and application information may be amended and/or updated (via work station 72 and local metrics database 68), such as, for example, actual start date of project, application or project change, description of and reason for change, application or project defect, description of and reason for defect, actual effort (e.g., monthly basis) expended on projects (e.g., for enhancements or developments), actual effort (e.g., monthly basis) expended on applications (e.g., for maintenance efforts), other efforts expended by group (e.g., all non-project or non-application related efforts), and amendments or changes to estimated dates, estimated function point counts and total estimated effort (including reasons for the change).

Once a project has been completed, certain "actual" information is preferably input to the central metrics database 62 (via work station 72 and local metrics database 68), such as, for example, the actual end date of the project and the actual function point count.

In the preferred embodiment, the method of cost estimating and pricing an application is based on the method of measuring the output of the application in function points. Specifically, the measurements are based on the number of units of output in the maintenance of the application and the number of units delivered by enhancements performed on the application. Pricing may also be based on the use of pricing chargebands, such as, for example, maintenance chargebands and enhancement chargebands. The chargeband values have been developed using statistical methods, industry data, and calibrating the information to a specific user's or customer's environment.

Prices for application systems which are in the production phase of their life cycle are based on the cost incurred to maintain the system. Prices per unit (i.e., per function point) are derived from the relative and potential cost as measured by a composite index. This index is preferably derived from the following inputs: condition of the software code; availability and quality of the software documentation, as measured through a survey calibrated against the Oman Index; the size and co-location of the user base (numbers of users and sites); and the size (magnitude) of the application.

Three rates may be established for maintenance work, based on the complexity as reflected by the combined indices described above (i.e., maintainability, functional size, number of users, and numbers of sites). The "pool" of applications complying with each rate structure are thus defined in "bands." The portfolio maintenance price may be determined by summing across the three bands, the product of the total function points in each band times the rate for the band. For example: Total cost =((function points band a×rate a)+(function points band b×rate b)+(function points band c×rate c)). This total cost is the unburdened or total direct cost. A price may be established by adding an appropriate burden and profit margin to the total direct cost.

Enhancement prices are also based on a three-rate structure. The direct unit cost may be assigned, based on the assignment of a project to a band. The assignment is preferably made as a reflection of the complexity of the project that will build the software product, and also the complexity of the product itself. A priceband assignment tool is used for each project to determine the priceband. The estimated size of the project (function points), the priceband for the application for which the project was performed, and a plurality of cost drivers and effort multiplication factors relating to the project, process, staff and work schedules, are preferably input to the priceband assignment tool.

In determining the estimated cost (and price) of applications according to the preferred embodiment of the invention (e.g., blocks 12 and 14 in FIG. 1A), function point measurements are used with an output based cost model. Specifically, a fair cost structure is established for a marginal unit of software delivered. A first cost model can be used for establishing the unit cost for maintenance efforts, and another cost model can be used for establishing the unit cost for enhancement work. For the enhancement work, a theoretical model preferably uses a spreadsheet format to implement expected value theory and a range of delivery rate expectations based on known industry information. This model assumes that certain environmental profiles can impact the delivery rate ranges for any enhancement or new development. A practical model is used, for a given environmental profile, to establish an expected delivery rate. The practical model assumes that an estimate of size is always part of the profile input to the model which predicts the delivery rate. Using the expected delivery rate, the theoretical model is used to determine the marginal unit cost (per function point) for the project involved. The total direct cost for the project can be determined by multiplying the marginal unit cost by the number of units (function points) measured. A price for the project can be determined by adding the total direct cost to the allocable overhead (fixed) cost, and adding a profit figure to that result.

Specifically, a cost estimating model is preferably used to determine the total direct cost. For the preferred embodiment, the model family called "COCOMO.2" (Version 2) developed by the University of Southern California (and published in 1995 by the USC Center for Software Engineering) has been successfully used as a cost estimating model. In accordance with the invention, the COCOMO.2 model family has been implemented in software using Microsoft Access® as the preferred database, and Visual Basic® preferably to paint a computer terminal's screen.

Generally, the preferred cost estimating model provides a highly accurate estimate of a software project's delivery rate. Once an estimated delivery rate has been derived, the software indicates future points in the project's life cycle where more refined estimates are to be made. This approach ensures that any increase in the project's functional size that is desired by a customer is recorded, along with recording any impact caused by the number and type of changes that occurred during the project. Consequently, the customer can be made aware of the impact of its changes at the time the delivery project or application is purchased.

A characteristic profile of the project or application is developed and used to formulate a unique index for the project or application and assign the index to a cost band. The range of costs included in such a band are derived from a combination of an "effort multiplier" and scaling factor weights derived for the project or application from the cost estimating model. Once a project or application to be delivered is assigned to a cost band, the total direct cost for the project or application can be derived, by multiplying the number of function points counted for the project or application by the marginal unit cost of the assigned band. This overall cost for the project or application can be derived by adding the total direct costs to the fixed costs. The direct costs preferably include all activities associated with the project or application, except overhead. The overhead costs are preferably allocated as fixed costs.

Figure 4:
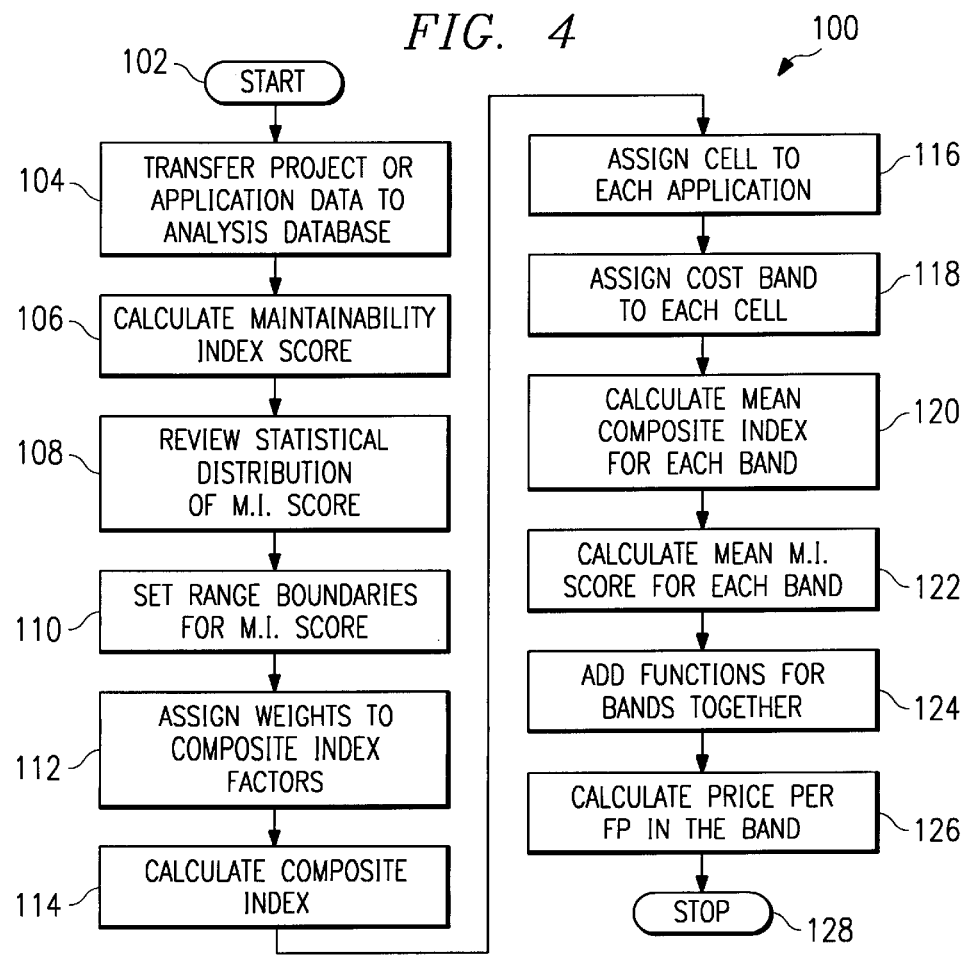
FIG. 4 is an exemplary flow chart that illustrates a method for updating cost data for application in a maintenance environment, in accordance with a preferred embodiment of the present invention.

FIG. 4 is a flow chart that illustrates a method 100 for updating cost data for a project or application in a maintenance environment, in accordance with a preferred embodiment of the present invention. Such a method allows a user to update a master file of cost data in a maintenance portfolio at regularly scheduled intervals. The method also allows a user to update the marginal unit cost of maintenance activity's function points in the portfolio.

The costs data update method 100 is initiated at block 102. Some of the steps of method 100 can be performed manually, or the entire method can be implemented automatically by software running, for example, on a personal computer processor having at least a 486 microprocessor (not explicitly shown). At block 104, certain project or application data are transferred (preferably by a computer processor) from a database (e.g., lookup database 66 in FIG. 3) preferably residing on a magnetic mass storage device, such as, for example, a disk drive, to an analysis database (e.g., central metrics database 62 in FIG. 3). A statistical software package called SYSTAT® has been successfully used to perform the analyses in such an analysis database. However, any appropriate statistical software analysis package may be used. It is preferred that the following data be transferred to the analysis database: entity (e.g., company's or customer's name); entity's country of residence; total maintainability score (described below); indicator of full or short term survey performed (described below); number of users of project or application; number of user sites; size in function points of the project or application, and FTEs used.

At block 106, a maintainability index score is derived from the total maintainability score.

Specifically, for the preferred embodiment, if the survey indicator shows that the survey performed was a "full" survey, then the maintainability index score is calculated preferably by multiplying the total maintainability score by 25/54. The maintainability score is the result of summing the responses provided in a survey used by Dr. Paul Oman in deriving his maintainability model (referred to above), which is commonly referred to as the "AFOTEC Survey." Dr. Oman calibrated his survey to his model, with a modified 25 question survey. Since the original survey was a 54 question survey, the ratio 25/54 is used to normalize the full survey to the modified, calibrated survey.

At block 108, for the preferred embodiment, an analyst reviews the statistical distribution of the derived maintainability index score data. For example, the analyst studies the 25th, 50th and 75th percentiles, the mean and standard deviations and compares them with the mean median (50th percentile), and preferably conducts a "stem and leaf plot" to confirm the validity of the normality conclusions.

At block 110, the range boundaries for the maintainability index score are set to the 25th and 75th percentiles. At block 112, weights are preferably assigned to each of the factors that make up the composite index (e.g., project or application size in function points, and number of users and user sites involved). The weights are preferably assigned as follows:

|  | Weight |
|---|---|
| SIZE WEIGHT | |
| Size in function points | |
| <100 function points | 2 |
| >=100 and <1000 function points | 3 |
| >=1000 function points | 5 |
| USER WEIGHT | |
| Number of Users | |
| <15 | 1.5 |
| >=15 and <68 | 3 |
| >=68 | 4.5 |
| SITE WEIGHT | |
| Number of Sites | |
| <15 | 1 |
| >=15 and <214 | 3 |
| >=214 | 4.5 |

At block 114, the composite index is derived by summing the size, user and site weights for the project or application together. At block 116, each application is preferably assigned to a unique cell according to its maintainability index score and composite index as follows:

| Cell | Maintainability Score | Composite Index |
|---|---|---|
| 1 | >73 | <= 4.5 |
| 2 | >73 | >4.5 and ≦9 |
| 3 | >73 | >9 |
| 4 | >39 and <=73 | <=4.5 |
| 5 | >39 and <=73 | >4.5 and ≦9 |
| 6 | >39 and <=73 | >9 |
| 7 | <=39 | <=4.5 |
| 8 | <=39 | >4.5 and ≦9 |
| 9 | <=39 | >9 |

At block 118, each cell is assigned to an appropriate cost band as follows:

| CELL | | |
|---|---|---|
| 3 | 6 | 9 |
| 2 | 5 | 8 |
| 1 | 4 | 7 |

| BAND | |
|---|---|
| Cell Numbers | Band Number |
| 1, 2, 4 | 1 |
| 3, 5, 7 | 2 |
| 6, 8, 9 | 3 |

At block 120, the mean composite index is calculated for each band. At block 122, the mean maintainability index score is calculated for each band as the average maintainability index score for all applications falling in the band. At block 124, the function points associated with each band are added together. At block 126, the total maintenance cost for the application or project is calculated by multiplying the application's total function points by the appropriate price band rate. The method is terminated at block 128.

Figure 5:
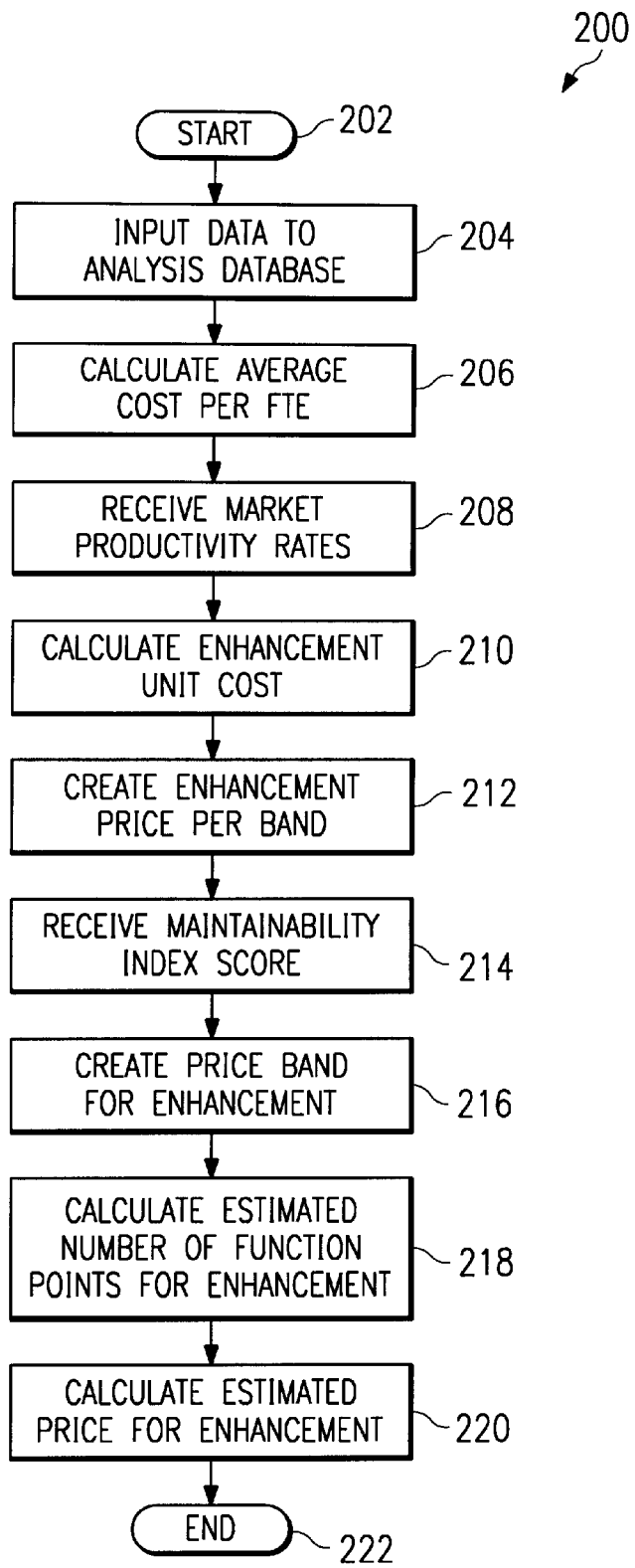
FIG. 5 is an exemplary flow chart that illustrates a method for calculating a cost for a project or application in an enhancement environment, in accordance with a preferred embodiment of the present invention.

FIG. 5 is a flow chart that illustrates a method 200 for updating cost data for a project or application in an enhancement environment, in accordance with a preferred embodiment of the present invention. Such a method allows a user to calculate the price of an enhancement, such as the creation, installation, and integration of new system functions.

Enhancement cost method 200 is initiated at block 202. Like the maintenance cost method shown in FIG. 4, some of the steps of method 200 can be performed manually, or the entire method can be implemented automatically by running software, for example, on a personal computer processor having at least at "486" microprocessor (not explicitly shown). At block 204, data for the application enhancement is input to an analysis database (e.g., central metrics database 62 in FIG. 3). This data may include the following: entity (e.g., company's or customer's name); entity's country of residence; indicator of full or short term survey performed; number of users of project or application; name or identification of project or application being enhanced; identification of any major related project; and FTEs used.

At block 206 the average cost per FTE is calculated for the enhancement application. At block 208, market productivity rates are received. At block 210, using the enhancement cost model, the enhancement unit cost is calculated from the average cost per FTE and the market productivity rates. Profitability is added into the enhancement unit cost. At block 212, the enhancement price per band is created from the calculated enhancement unit cost (including profitability).

At block 214, a maintainability index score of the most affected application is received. At block 216, using a cost estimating model (e.g., the COCOMO.2 tool), a price band for the enhancement is created. The price band represents the actual cost per function point of the enhancement project.

At block 218, the estimated number of function points for the enhancement application is calculated, for example, by following the method described with reference to FIG. 2. At block 220, the total enhancement cost, including profit, for the enhancement of the application is calculated. Method 200 is terminated at block 222.

Although the present invention and its advantages have been described in detail, it should be understood that various changes, substitutions, and alterations can be made herein without departing from the spirit and scope of the invention as defined by the appended claims.

What is claimed is:

1. A method for determining a cost for maintaining a software application, comprising the steps of:

receiving and storing functional metrics data of the software application in a computer readable storage medium wherein the functional metrics data includes software size in function points, number of users, and number of sites;

determining a composite index of the software application from the functional metrics data;

receiving and storing maintenance information for the software application in the computer readable storage medium;

determining a maintainability index of the software application from the maintenance information, the maintainability index providing an indication of the availability and quality of documentation for the software application;

receiving and storing an average cost per full-time equivalent in the computer readable storage medium;

determining a maintenance unit cost of the software application from the composite index, the maintainability index, and the average cost per full-time equivalent;

determining a total maintenance cost of the software application from the maintenance unit cost and the size in function points of the software application, the total maintenance cost providing an indication of the level of maintenance effort required to maintain the software application; and performing maintenance on the software application in response to the total maintenance cost not exceeding a desired threshold.

2. The method of claim 1, wherein the step of determining a composite index further comprises the steps of:

assigning weights to the functional metrics of software size, number of users, and number of sites; and summing the assigned weights to determine the composite index.

3. The method of claim 1, further comprising the step of creating a plurality of pricing chargebands to differentiate between differing levels of maintenance effort based on the complexity of the software application and the complexity of the maintenance environment.

4. The method of claim 3, wherein the step of creating a plurality of pricing chargebands further comprises establishing a plurality of rates to differentiate between differing levels of maintenance effort based on the complexity of the software application and the complexity of the maintenance environment.

5. The method of claim 4, further comprising the steps of:

assigning the function points of the software size functional metric for the software application to pricing chargebands based on the composite index and the maintainability index; and calculating a total maintenance cost by summing together the product of the function points assigned to each of the plurality of pricing chargebands and the pricing chargeband rate.

6. The method of claim 1, further comprising the step of adding a profitability amount to the total maintenance cost.

7. A method for determining a total cost for an enhancement to a software application portfolio which consists of several software applications, comprising the steps of:

determining what software applications within the portfolio are affected by the enhancement;

receiving and storing functional metrics data for each software application in the portfolio affected by the enhancement in a computer readable storage medium wherein the functional metrics data includes software size in function points, number of users, and number of sites;

determining a composite index from the functional metrics data;

receiving and storing maintenance information for the software application most affected by the enhancement in the computer readable storage medium;

determining a maintainability index for the most affected software application from the maintenance information, the maintainability index providing an indication of the availability and quality of documentation for the software application;

receiving an average cost per full-time equivalent;

estimating a size of the enhancement to the software application portfolio in function points;

determining an enhancement unit cost using a computer from the composite index, the maintainability index, and the average cost per full-time equivalent;

determining a total enhancement cost from the enhancement unit cost and the estimated size in function points of the enhancement, the total enhancement cost providing an indication of an effort required for enhancing the software application portfolio; and performing enhancements on the software application in response to the total enhancement cost not exceeding a desired threshold.

8. The method of claim 7, further comprising the step of creating a plurality of pricing chargebands to differentiate between differing levels of enhancement effort based on the complexity of the enhancement and the complexity of the software application portfolio.

9. The method of claim 7, further comprising the step of adding a profitability amount to the calculated total enhancement cost.

10. The method of claim 7, wherein the step of estimating the size of the enhancement further comprises the steps of:

determining an unadjusted function point count;

determining a value adjustment factor; and calculating a final adjusted function point count.

11. The method of claim 7, further comprising the step of establishing an expected delivery rate to determine the cost per function point of the enhancement.

12. The method of claim 8, wherein the step of creating a plurality of pricing chargebands further comprises establishing a plurality of rates to differentiate between differing levels of enhancement effort based on the complexity of the enhancement and the complexity of the software portfolio.

13. The method of claim 12, wherein the step of calculating a total enhancement cost comprises the steps of:

assigning the enhancement to a pricing chargeband based on the complexity of the enhancement and the complexity of the software application portfolio; and determining a total enhancement cost from the estimated size in function points of the enhancement and the rate of the pricing chargeband to which the enhancement was assigned.

14. The method of claim 7, further comprising:

developing a replacement software application in response to the total enhancement cost exceeding a desired threshold.

15. The method of claim 1, further comprising:

developing a replacement software application in response to the total maintenance cost exceeding a desired threshold.

* * * * *